(12) United States Patent
Moon et al.

(10) Patent No.: US 10,585,555 B2
(45) Date of Patent: Mar. 10, 2020

(54) MOBILE TERMINAL AND CONTROLLING METHOD THEREOF

(71) Applicant: LG ELECTRONICS INC., Seoul (KR)

(72) Inventors: Taeyoung Moon, Seoul (KR); Seungmin Jeong, Seoul (KR); Seungwoon Yang, Seoul (KR); Boyoung Mun, Seoul (KR); Eunjung Lim, Seoul (KR); Jinseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 343 days.

(21) Appl. No.: 15/510,802

(22) PCT Filed: May 12, 2015

(86) PCT No.: PCT/KR2015/004738
§ 371 (c)(1),
(2) Date: Mar. 13, 2017

(87) PCT Pub. No.: WO2016/056723
PCT Pub. Date: Apr. 14, 2016

(65) Prior Publication Data
US 2017/0277399 A1  Sep. 28, 2017

(30) Foreign Application Priority Data

Oct. 8, 2014  (KR) .................. 10-2014-0135897

(51) Int. Cl.
*G06F 3/0488* (2013.01)
*G06F 3/0481* (2013.01)
*G06F 3/0482* (2013.01)

(52) U.S. Cl.
CPC ........ *G06F 3/04817* (2013.01); *G06F 3/0482* (2013.01); *G06F 3/0488* (2013.01)

(58) Field of Classification Search
CPC ... G06F 3/0488; G06F 3/04817; G06F 3/0482
See application file for complete search history.

(56) References Cited

U.S. PATENT DOCUMENTS

| 2008/0229280 A1 | 9/2008 | Stienhans |
| 2009/0019385 A1 | 1/2009 | Khatib et al. |
| 2010/0138763 A1 | 6/2010 | Kim |

(Continued)

FOREIGN PATENT DOCUMENTS

EP  2 535 806 A1  12/2012

*Primary Examiner* — Andrea C Leggett
(74) *Attorney, Agent, or Firm* — Birch, Stewart, Kolash & Birch, LLP

(57) ABSTRACT

A method of controlling a mobile terminal, and which includes selecting at least first and second applications to be simultaneously run together; displaying, via a touchscreen of the mobile terminal, an integrated icon corresponding to the selected first and second applications; and simultaneously running, via a controller of the mobile terminal, the first and second applications and displaying execution screens of the first and second applications in a formation corresponding to a layout of the created integrated icon, in response to a selection of the integrated icon.

19 Claims, 21 Drawing Sheets

(56) References Cited

U.S. PATENT DOCUMENTS

2011/0138314 A1* 6/2011 Mir ................ G06F 3/0484
 715/779
2013/0135178 A1 5/2013 Miyahara
2014/0068477 A1 3/2014 Roh
2014/0325428 A1 10/2014 Lee et al.

* cited by examiner

MOBILE TERMINAL AND CONTROLLING METHOD THEREOF

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating at least two or more applications to be simultaneously run.

Discussion of the Background

Generally, terminals can be classified into mobile/portable terminals and stationary terminals. The mobile terminals can be further classified into handheld terminals and vehicle mount terminals according to possibility of user's direct portability. As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, at least two or more applications can be simultaneously run owing to the performance improvement of a mobile terminal, and some of the simultaneously run application may be run in window mode instead of being displayed on a full screen. However, in order to run a plurality of applications simultaneously, the applications should be sequentially run one by one. When a plurality of applications are run in window mode, it is inconvenient to adjust a layout of a running window corresponding to each of the applications every time.

SUMMARY OF THE INVENTION

Accordingly, one aspect of the present invention is directed to a mobile terminal and controlling method thereof that substantially obviate one or more of the problems due to limitations and disadvantages of the related art.

One object of the present invention is to provide a mobile terminal and controlling method thereof, by which a plurality of applications can be simultaneously run more conveniently.

Another object of the present invention is to provide a mobile terminal and controlling method thereof, by which a plurality of applications can be run through a single icon.

Another object of the present invention is to provide a mobile terminal and controlling method thereof, which avoids adjusting a layout of a running window corresponding to each of a plurality of applications every time.

Technical tasks obtainable from the present invention are non-limited by the above-mentioned technical tasks. And, other unmentioned technical tasks can be clearly understood from the following description by those having ordinary skill in the technical field to which the present invention pertains.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a mobile terminal according to one embodiment of the present invention includes a touchscreen and a controller, if at least two applications are selected, creating an integrated icon corresponding to the selected at least two applications, the controller, if the created integrated icon is selected, controlling the selected at least two applications to be run simultaneously in a formation corresponding to the created integrated icon.

To further achieve these and other advantages and in accordance with the purpose of the present invention, as embodied and broadly described, a method of controlling a mobile terminal according to one embodiment of the present invention includes the steps of selecting at least two applications, creating an integrated icon corresponding to the selected at least two applications and if the created integrated icon is selected, running the selected at least two applications simultaneously in a formation corresponding to the created integrated icon.

It is to be understood that both the foregoing general description and the following detailed description are exemplary and explanatory and are intended to provide further explanation of the invention as claimed.

Accordingly, the present invention provides the following effects and/or features.

First of all, according to the present invention, a plurality of applications can be simultaneously run more conveniently.

Particularly, according to the present invention, a plurality of applications can be simultaneously run through an integrated icon instead of selecting an icon corresponding to each of a plurality of the applications individually.

Secondly, according to the present invention, since a layout of a running window corresponding to each application is determined depending on layouts of application icons disposed within an integrated icon, it is unnecessary to change a layout for each running window every time.

Effects obtainable from the present invention may be non-limited by the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. The above and other aspects, features, and advantages of the present invention will become more apparent upon consideration of the following description of preferred embodiments, taken in conjunction with the accompanying drawing figures.

In the drawings.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
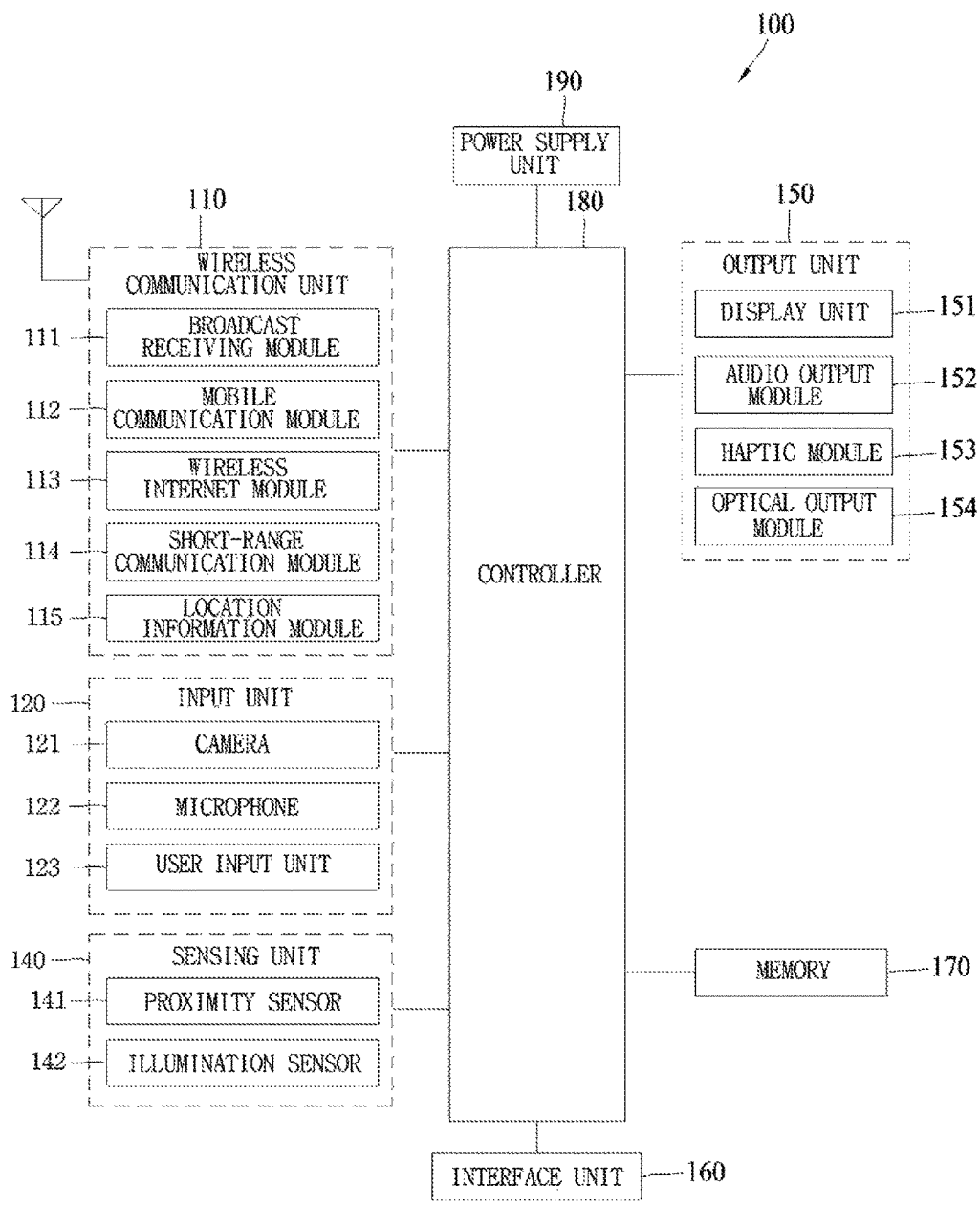
FIG. 1a is a block diagram illustrating a mobile terminal in association with the present invention.
Figure 1B:
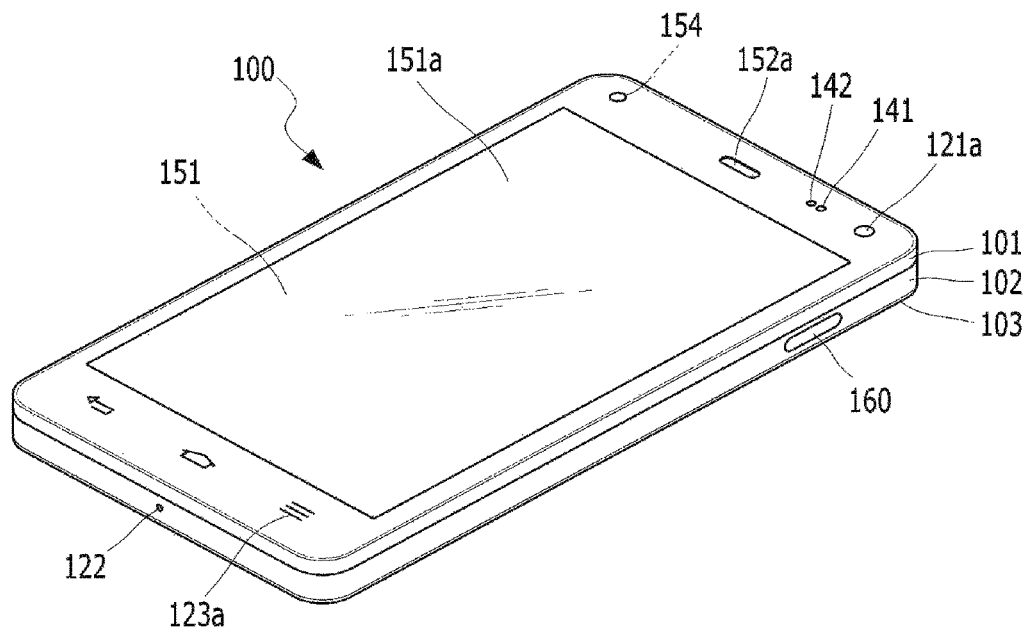
FIG. 1b and FIG. 1c are diagrams illustrating one example of a mobile terminal in association with the present invention in different views.
Figure 1C:
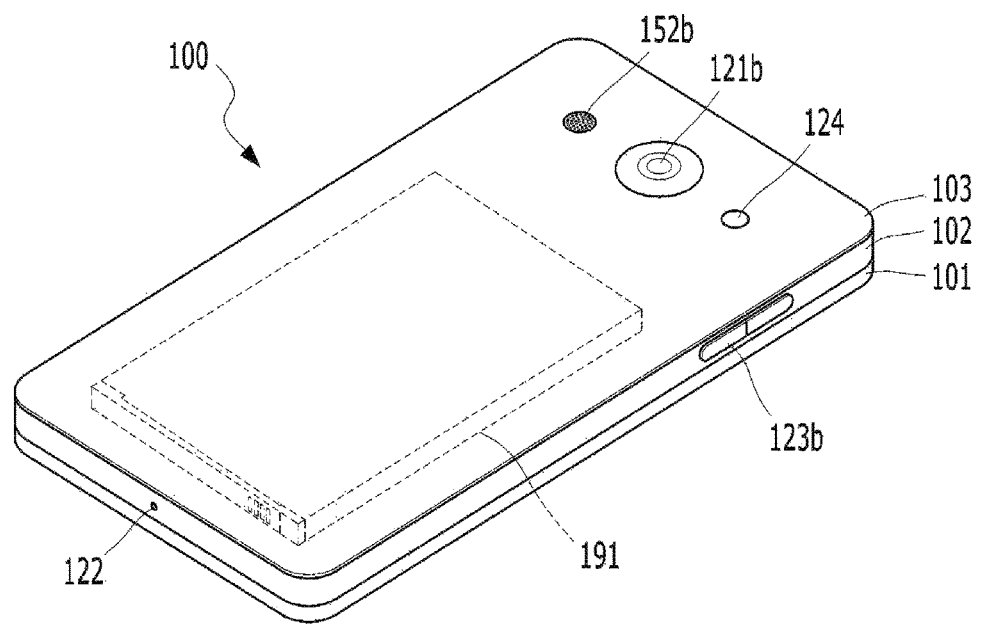

Reference is now made to FIGS. 1a-1c, where FIG. 1a is a block diagram of a mobile terminal in accordance with the present disclosure, and FIGS. 1b and 1c are conceptual views of one example of the mobile terminal, viewed from different directions. According to the present invention, various functions are provided through linked operations between a mobile terminal and a wearable device. Therefore, a configuration of a watch type wearable device is described as one example of a wearable device to which the present invention is applicable.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 typically controls the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1b and 1c, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1b and 1c depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject. As shown in FIG. 1c, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Simultaneous Execution of a Plurality of Applications

When at least two applications are simultaneously run or executed through multitasking in a general mobile terminal, a later run application is displayed on the display 151 and an earlier run application is maintained in background state in which a running screen is not displayed, in general. Of course, if the later run application is run in window mode, a part of the running screen of the earlier run application, which is not blocked by the running screen of the later run application, may be displayed. This is described in detail with reference to FIG. 2 as follows.

Figure 2:
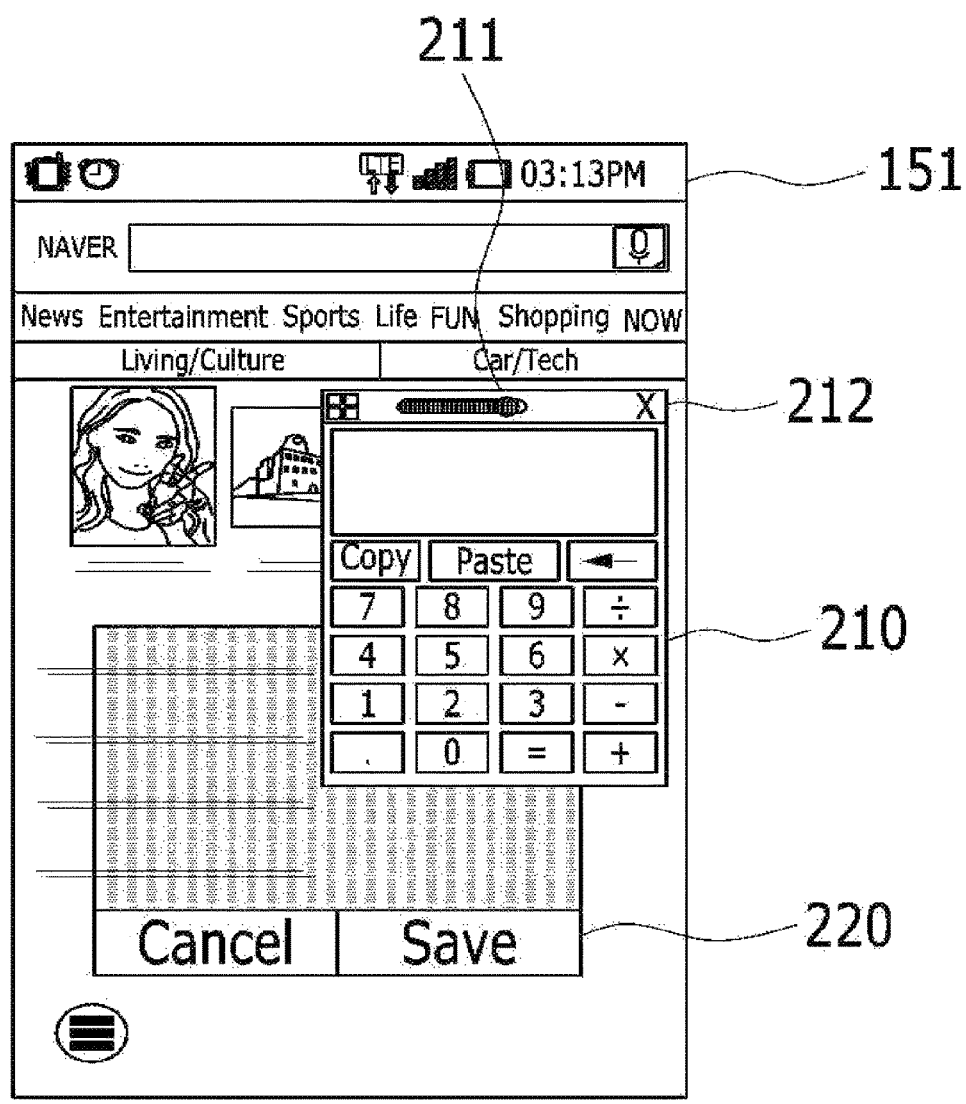
FIG. 2 is a diagram illustrating one example of running a plurality of applications simultaneously in a general mobile terminal.

FIG. 2 is a diagram illustrating one example of running a plurality of applications simultaneously in a general mobile terminal. In FIG. 2, a web browser application is assumed as run initially, a plurality of applications are assumed as run in order of a memo pad application and a calculator application, and the memo pad application and the calculator application are assumed as run in window mode.

Referring to FIG. 2, while a web browser application is run as a full screen on the display 151, a memo pad application is run in the second place, a running window 220 of the memo pad application is displayed in window mode, a calculator application is finally run, and a running window 210 of the calculator application is displayed on a top position. Further, a slider 211 for adjusting transparency and an end button 212 for ending the corresponding window can be displayed on each of the running windows. If this method is employed, although running images of a plurality of applications can be watched simultaneously, a plurality of the applications should be run in order by a user. Moreover, since a plurality of running windows in window mode may overlap each other, it is inconvenient to adjust a layout (e.g., absolute/relative positions between windows on a display) or transparency.

Therefore, one embodiment of the present invention provides that a plurality of applications are simultaneously run through a single integrated icon. Moreover, if a plurality of applications are run through an integrated icon, a layout of running windows has a shape corresponding to the integrated icon. This is described in detail with reference to FIG. 3 as follows.

Figure 3:
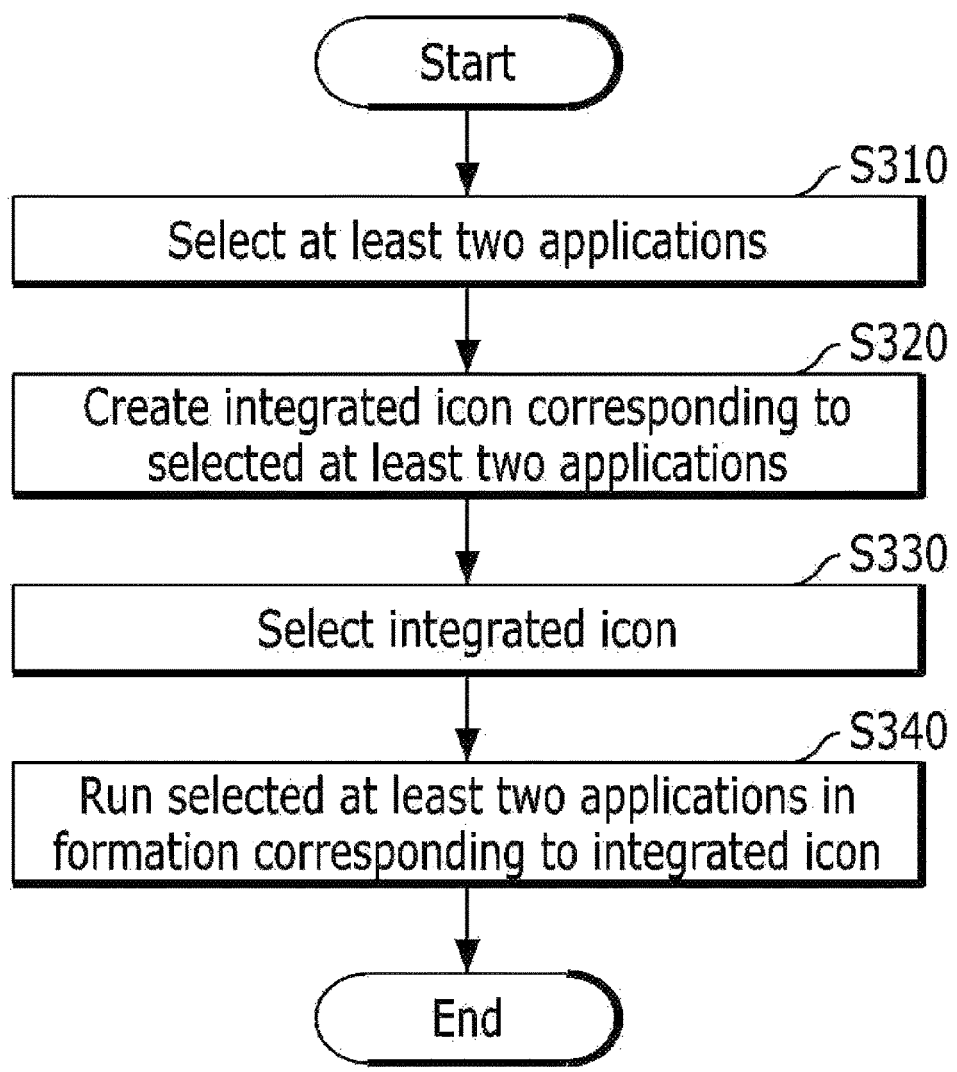
FIG. 3 is a flowchart illustrating one example of a process for creating an integrated icon and then simultaneously running at least two applications through the integrated icon in a mobile terminal according to one embodiment of the present invention.

FIG. 3 is a flowchart illustrating one example of a process for creating an integrated icon and then simultaneously running at least two applications through the integrated icon in a mobile terminal according to one embodiment of the present invention. Referring to FIG. 3, at least two applications can be selected to be run simultaneously (S310). In particular, the application selection may be performed by selecting an icon corresponding to a specific application from a home screen or an application list. The application selection may be performed by selecting a specific application from a multitasking list. And, one of the at least two applications may include a currently run application.

If the at least two application to be simultaneously run together are selected, an integrated icon corresponding to the selected at least two application can be created (S320). In this case, the integrated icon means an icon for running the selected applications simultaneously. And, icons of the selected applications may be displayed together within the integrated icon. In doing so, the icons of the selected applications may be disposed within the integrated icon by not overlapping one another. The reference for the disposition may be determined in response to the type selected in the step S310, or a disposition rule may be set in advance. Moreover, the integrated icon may be created at a preset location such as a home screen, an application list, a notification pane, an integrated application slot, which will be described later, and/or the like.

If the created integrated icon is selected through a touch input or the like (S330), the selected at least two applications can be run in a formation corresponding to the integrated icon S340). In this case, the formation corresponding to the integrated icon means that, when the running screens of the respective applications are exposed on the touchscreen without overlapping one another, a formation of mutual dispositions of the exposed portions corresponds to the formation of the dispositions of the icons corresponding to the applications within the integrated icon. For instance, when icons corresponding to two applications are disposed within the integrated icon by occupying a left half and a right half, respectively, if the integrated icon is selected, the two applications are run in a manner that the running screens of the run applications are displayed on left and right half regions of the touchscreen, respectively.

In the following description, as one of methods for creating an integrated icon, a method using an integrated application slot is described in detail with reference to FIG. 4. In particular, FIG. 4 is a flowchart illustrating one example of a process for creating an integrated icon through an integrated application slot and then simultaneously running at least two applications through the integrated icon in a mobile terminal according to one embodiment of the present invention.

Figure 4:
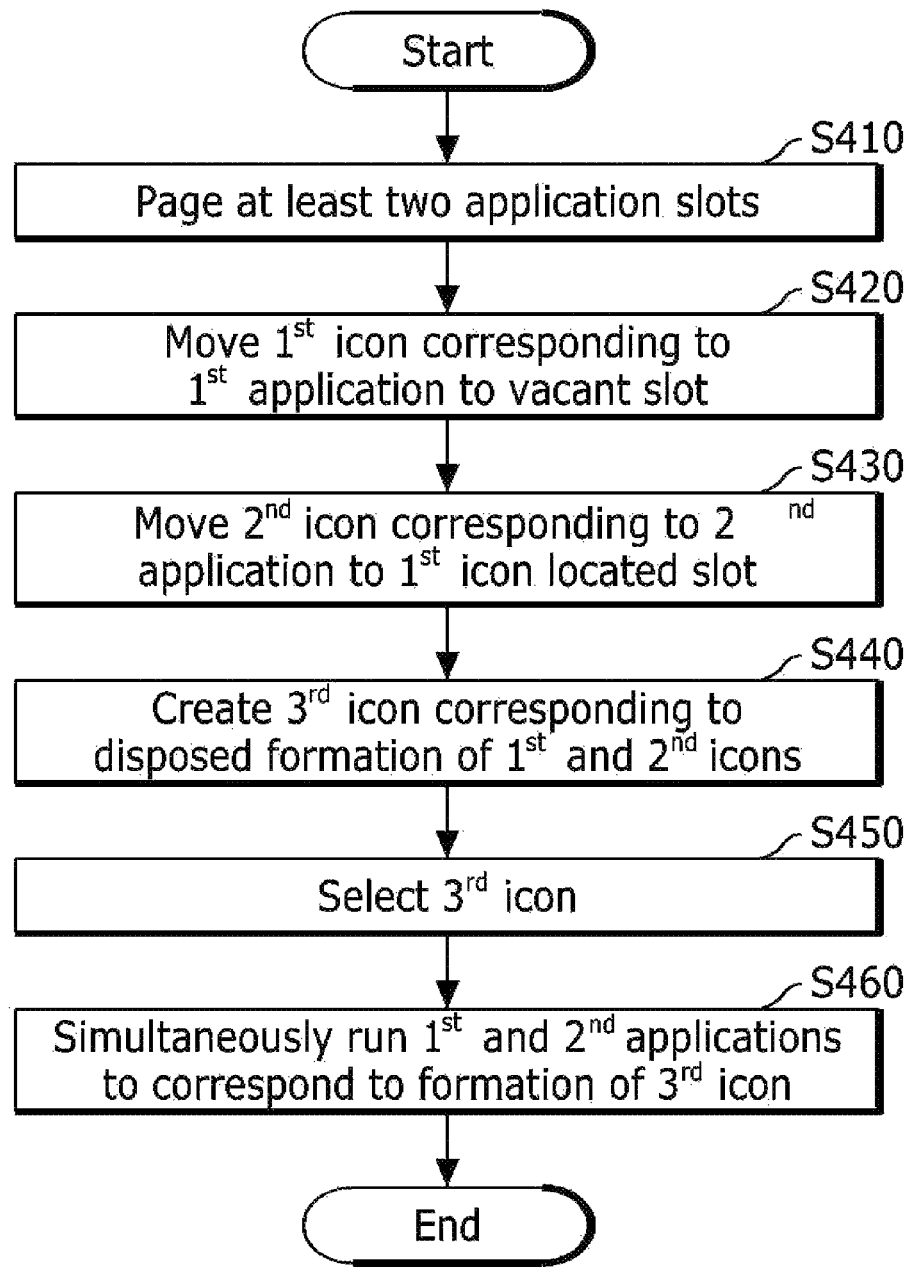
FIG. 4 is a flowchart illustrating one example of a process for creating an integrated icon through an integrated application slot and then simultaneously running at least two applications through the integrated icon in a mobile terminal according to one embodiment of the present invention.

Referring to FIG. 4, an integrated application slot can be paged (S410). In this case, the integrated application slot may mean a slot in which an integrated icon can be created or disposed. For clarity and convenience of the following description, the integrated application slot shall be named a slot. The slot may be disposed on a notification panel that appears in case of dragging an indicator region for indicating operating states of the mobile terminal through various indicators in a bottom direction from a top end portion of the touchscreen. Alternatively, the slot may appear if a random icon displayed on a home screen is long touched.

The integrated icons may be already disposed in the paged slots in accordance with settings or history of use, or some of the paged slots may be vacant. A user can move a first icon corresponding to a prescribed one (hereinafter named a first application) of applications desired to be simultaneously run by the user to the vacant slot (through a command input such as a touch & drag, or the like) (S420).

After the first icon has been moved to the slot, the user can move a second icon corresponding to a different one (hereinafter named a second application) of the applications desired to be simultaneously run by the user to the slot to which the first icon has been moved already (S430).

Hence, an integrated icon (hereinafter named a third icon) containing the first icon and the second icon can be created in the corresponding slot (S440). Further, depending on how the second icon approaches the corresponding slot, a relative disposition formation of the first and the second icons may be determined. For instance, if the second icon approaches toward a left side of the corresponding slot, the second icon and the first icon can be disposed on a left half and a right half of the corresponding slot, respectively.

Thereafter, if the third icon is selected through a touch input or the like (S450), both of the first application and the second application can be run or launched by corresponding to the internal formation of the third icon (S460). Meanwhile, the step S430 may be repeatedly performed in addition if the number of applications desired to be simultaneously run by the user is equal to or greater than 3. Therefore, it is apparent to those skilled in the art that more icons can be disposed within the integrated icon.

Figure 5:
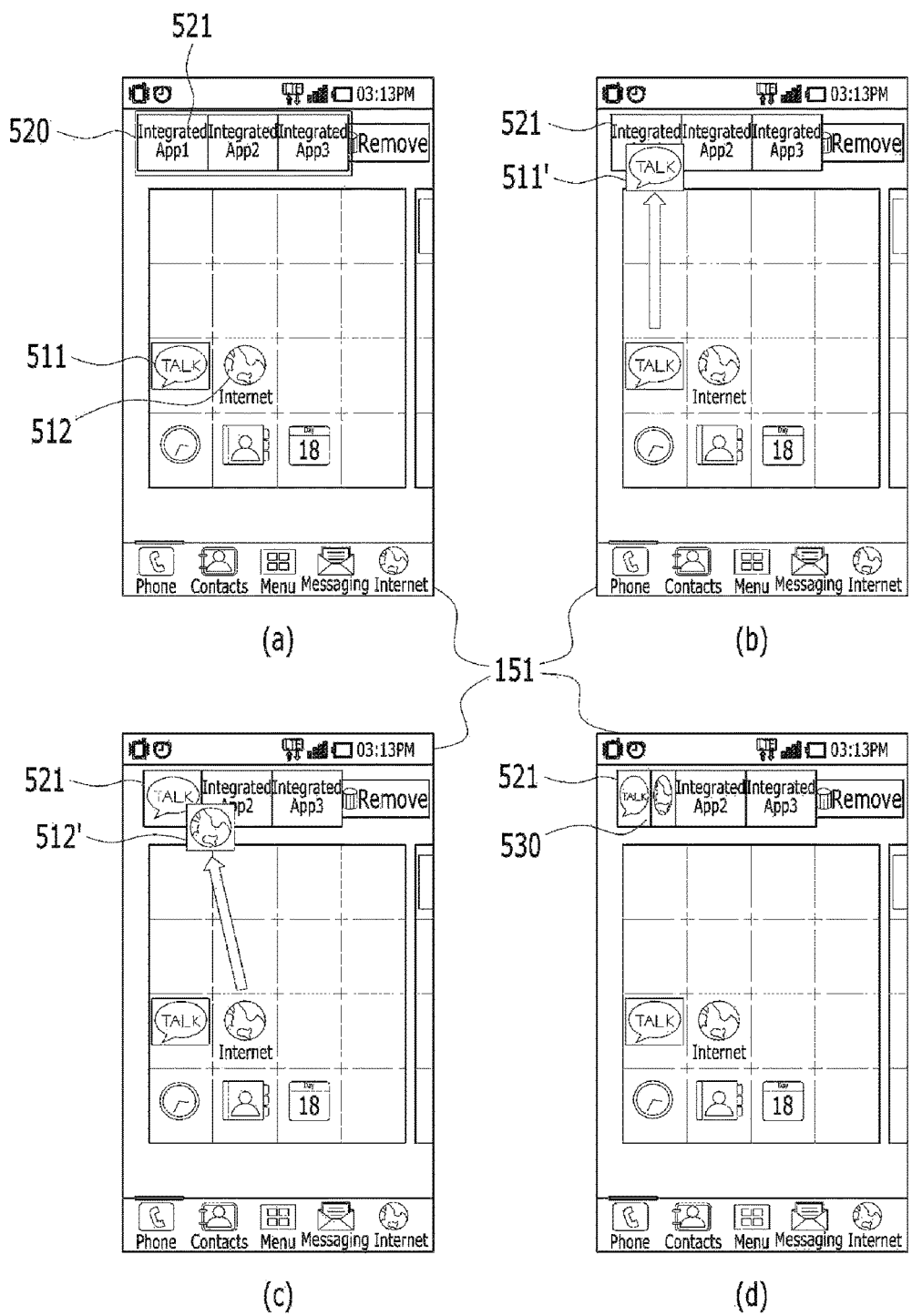
FIG. 5 is a diagram illustrating one example of a process for creating an integrated icon through an integrated application slot in a mobile terminal according to one embodiment of the present invention.

Methods of creating an integrated icon are described in detail with reference to FIGS. 5 to 8 as follows. In particular, FIG. 5 is a diagram illustrating one example of a process for creating an integrated icon through an integrated application slot in a mobile terminal according to one embodiment of the present invention. Referring to FIG. 5(a), when a home screen is displayed on the touchscreen 151, if a user intends to have icons 511 and 512 of applications included in an integrated icon, the user can apply an input of a long touch to the messenger icon 511. Until the long touch input is released, the messenger icon 511 is in a movable state and a plurality of slots 520 can be displayed on a prescribed region of the touchscreen 151.

In doing so, the slots 520 may be displayed on a top end space. In particular, the top end space is provided as a region for freely disposing icons in a center of the home screen is reduced at a prescribed rate. Subsequently, referring to FIG. 5(b), after the user has dragged the messenger icon 511 in the movable state to a vacant slot 521, the user can release the touch input. Hence, the messenger icon 511' can be displayed on the corresponding slot 521. Thereafter, if the user long touches the web browser icon 512 corresponding to a web browser icon, drags the web browser icon to a right side of the slot 521, and then releases the corresponding touch, referring to FIG. 5(d), an integrated icon 530 can be created from the corresponding slot 521. In particular, if the web browser icon 512 approaches toward the right side of the slot 521 and is then dropped, as shown in FIG. 5(c), the messenger icon 511' and the web browser icon 512' can be disposed on a left half and a right half within the integrated icon 530, respectively. On the contrary, if the web browser icon approaches toward the left side of the slot 521 and is then dropped, the web browser icon and the messenger icon may be disposed on the right half and the left half of the integrated icon 530, respectively.

Figure 6:
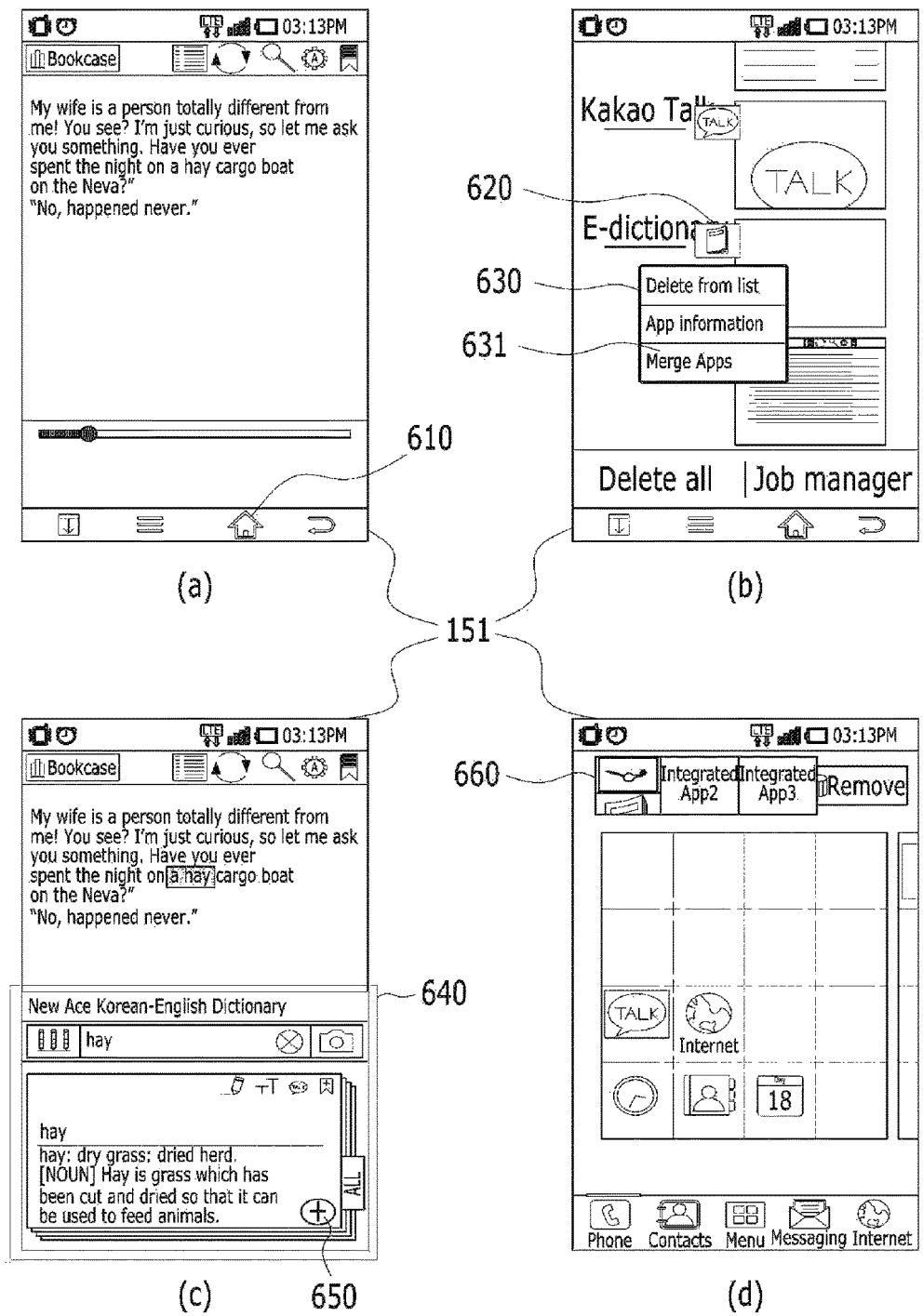
FIG. 6 is a diagram illustrating one example of a process for creating an integrated icon through a multitasking list in a mobile terminal according to one embodiment of the present invention.

FIG. 6 is a diagram illustrating one example of a process for creating an integrated icon through a multitasking list in a mobile terminal according to one embodiment of the present invention. Referring to FIG. 6(a), as an e-book application is run, a running screen is displayed on the touchscreen 151. In doing so, if a user long touches a home key button 610, referring to FIG. 6(b), a multitasking list, on which items of applications currently run as a background are listed, can be displayed. If the user selects an application item 620, which is desired to be simultaneously run, from the multitasking list through a touch input of a specific pattern (e.g., a long touch), menus 630 executable for the corresponding application item can be displayed.

If an application merge menu 631 is selected from the displayed menus 630, referring to FIG. 6(c), a running screen 640 of the application selected from the multitasking list can be displayed on a screen bottom end. In doing so, when the running screen 640 is displayed, an integrated icon add menu 650 can be displayed for a prescribed time. Before the integrated icon add menu 650 disappears, if the integrated icon add menu 650 is selected, an integrated icon, which can simultaneously run the currently run e-book application and the application selected from the multitasking list in a currently displayed manner, can be created. Referring to FIG. 6(c), the created icon can be created from one 660 of the vacant slots. And, it is a matter of course that the integrated icon can be created from one of various preset locations such as a notification panel, a vacant region of a home screen, a slot and the like.

Figure 7:
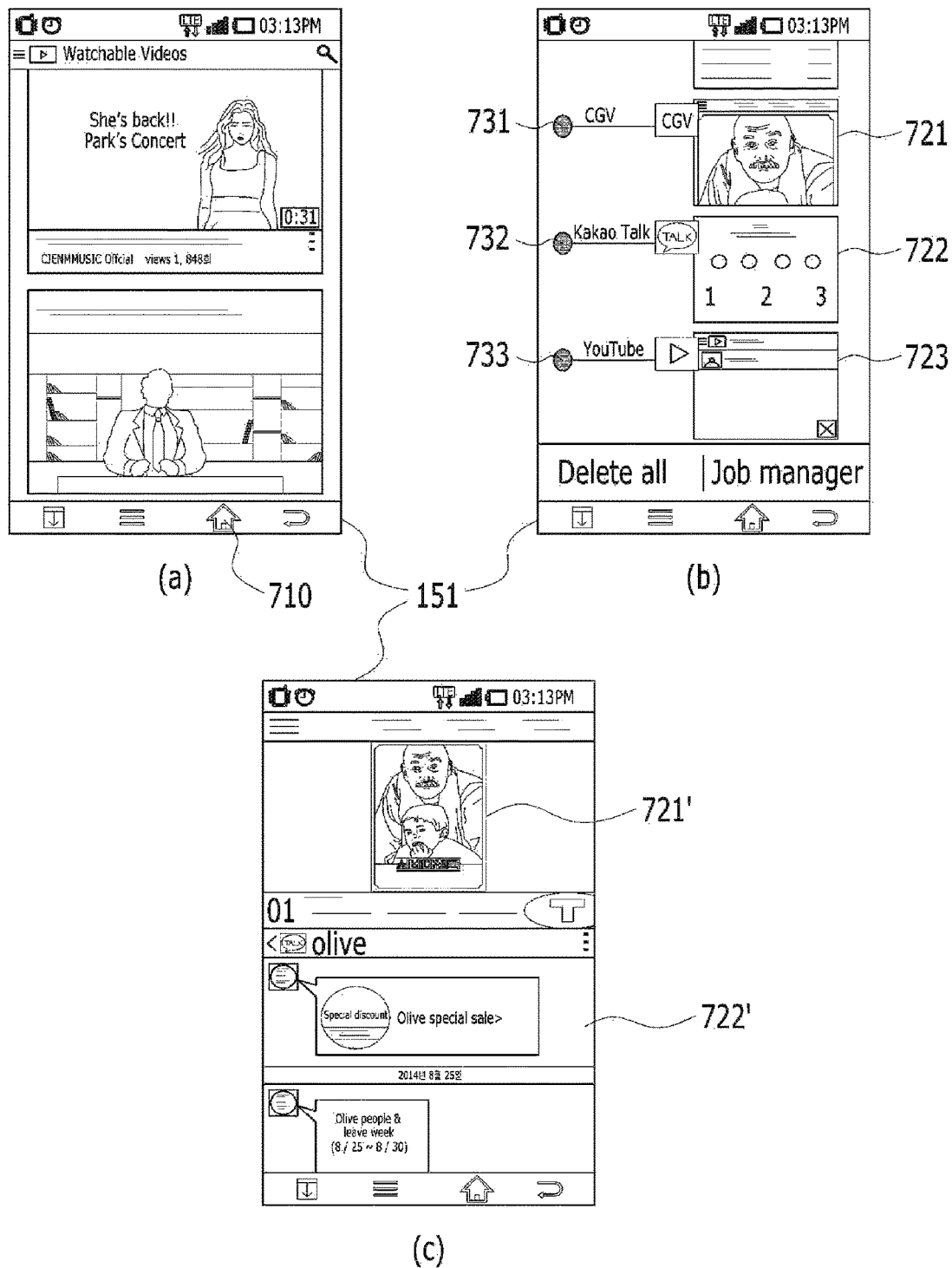
FIG. 7 is a diagram illustrating another example of a process for creating an integrated icon through a multitasking list in a mobile terminal according to one embodiment of the present invention.

FIG. 7 is a diagram illustrating another example of a process for creating an integrated icon through a multitasking list in a mobile terminal according to one embodiment of the present invention. Although FIG. 6 shows that one of applications supposed to be simultaneously run is a currently run application, FIG. 7 shows a process for selecting applications, which are to be simultaneously run and displayed, from applications currently operating as a background only by excluding a currently run application.

Referring to FIG. 7(a), as a video portal application is run, a running screen is displayed on the touchscreen 151. In doing so, if a user long touches a home key button 710, referring to FIG. 7(b), a multitasking list, on which items of applications currently run as a background are listed, can be displayed. In this case, check boxes 731 to 733 can be displayed on the application items 721 to 723 of the multitasking list, respectively. if a user selects the check boxes corresponding to the applications desired to be simultaneously run and then presses the home key again, referring to FIG. 7(c), running screens 721' and 722' of the applications selected through the check boxes can be displayed through split screens.

Figure 8:
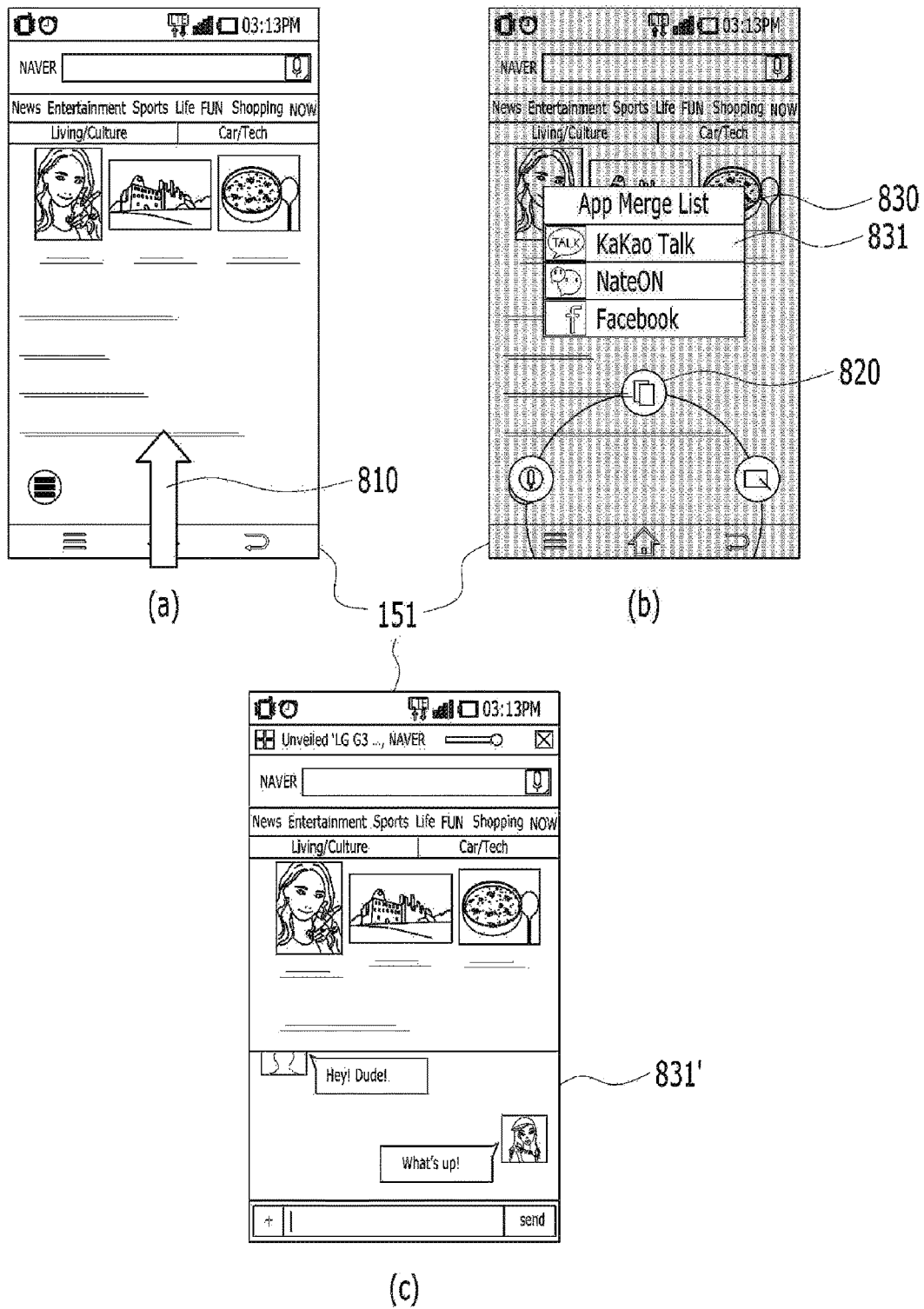
FIG. 8 is a diagram illustrating one example of a process for creating an integrated icon through a prescribed menu manipulation in a mobile terminal according to one embodiment of the present invention.

FIG. 8 is a diagram illustrating one example of a process for creating an integrated icon through a prescribed menu manipulation in a mobile terminal according to one embodiment of the present invention. Referring to FIG. 8(a), as a web browser application is run, a running screen is displayed on the touchscreen 151. In doing so, if a user inputs a flicking touch (or a touch & drag) performed by starting from a bottom end of the touchscreen 151 toward a top end direction, referring to FIG. 8(b), a plurality of menus can be paged to the bottom end of the touchscreen 151.

If an integrated application run menu 820 is selected from the paged menus, a list 830 of applications simultaneously runnable together with the currently run web browser application can be displayed. If a messenger application 831 is selected from the list 830, referring to FIG. 8(c), a running screen 831' of the messenger application selected from the list can be displayed on a bottom end of a screen together with the web browser application. Of course, an integrated icon add menu may be displayed for a prescribed time in the situation shown in FIG. 7(c) or FIG. 8(c) (not shown in the drawing).

Figure 9:
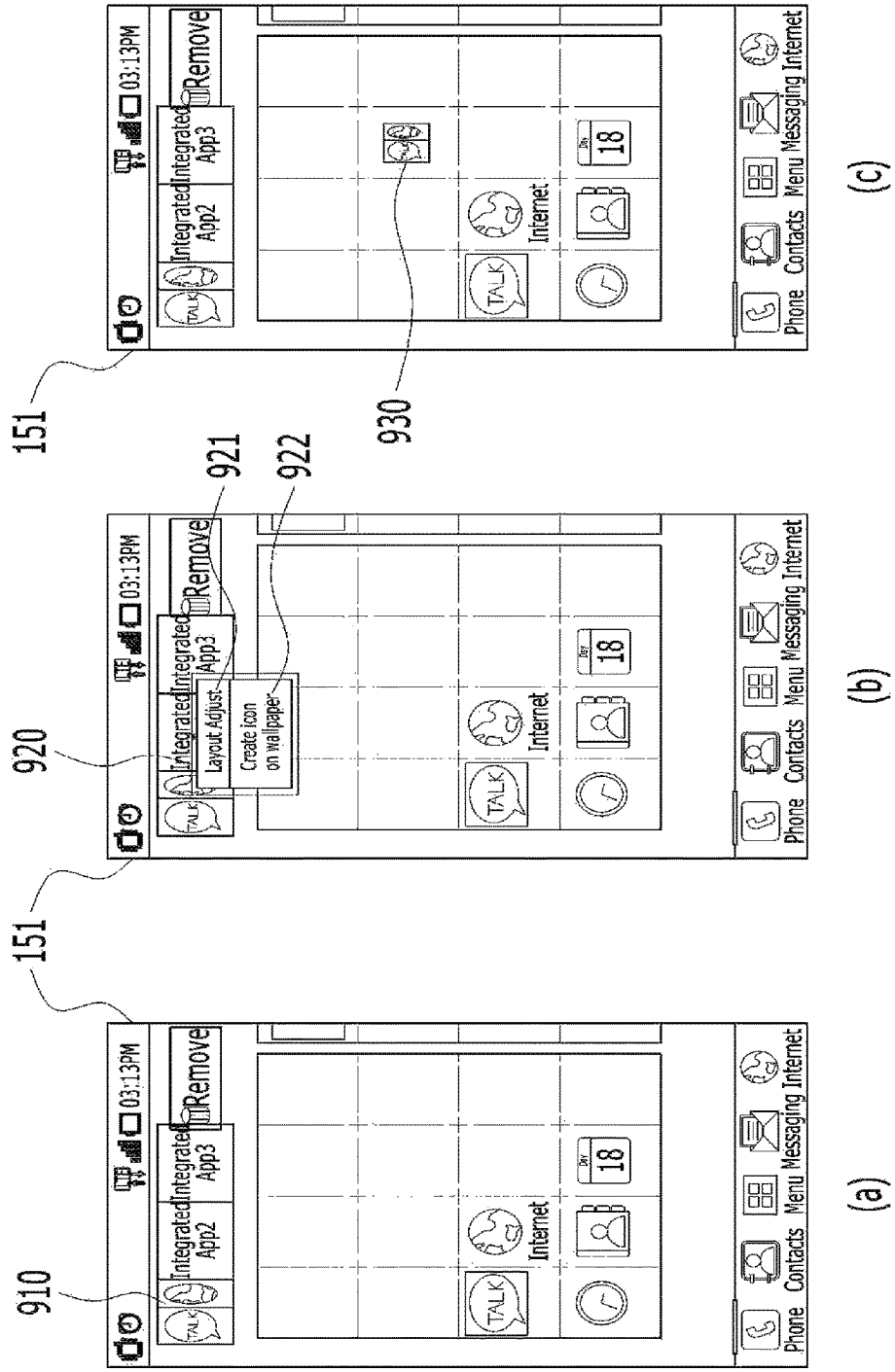
FIG. 9 is a diagram illustrating one example of a method of moving an integrated icon of a slot in a mobile terminal according to one embodiment of the present invention.

FIG. 9 is a diagram illustrating one example of a method of moving an integrated icon of a slot in a mobile terminal according to one embodiment of the present invention. Referring to FIG. 9(a), a plurality of slots are paged. If a slot 910 having an integrated icon disposed therein is selected through a touch input such as a long touch or the like, referring to FIG. 9(b), menus 920 executable for the corresponding integrated icon are displayed. In the displayed menus, a layout adjust menu 921 for changing a disposed state (i.e., a state that running screens are disposed on running applications simultaneously) of icons disposed within the integrated icon and an icon create menu 922 for copying the integrated icon to a wallpaper (e.g., home screen) may be included. If the icon create menu 922 is selected, referring to FIG. 9(c), an integrated icon 930 used to be disposed in the slot 910 can be created from one of vacant regions of the home screen.

Figure 10:
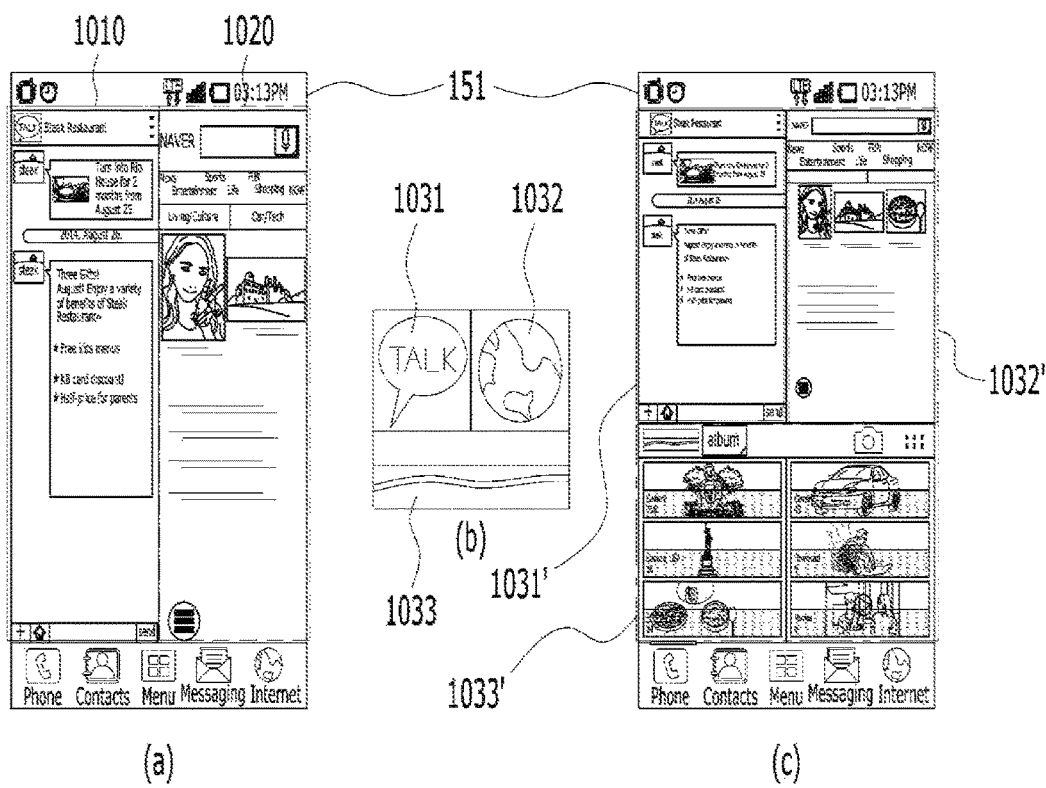
FIG. 10 is a diagram illustrating one example of determining a layout of applications in accordance with an icon disposition within an integrated icon in a mobile terminal according to one embodiment of the present invention.

FIG. 10 is a diagram illustrating one example of determining a layout of applications in accordance with an icon disposition within an integrated icon in a mobile terminal according to one embodiment of the present invention. Referring to FIG. 10(a), if the integrated icon of the slot 910 is selected in the situation shown in FIG. 9(a) or the integrated icon 930 displayed on the home screen is selected in the situation shown in FIG. 9(c), applications corresponding to icons disposed within the integrated icon 930 can be simultaneously run.

In doing so, a mutually disposed relation between the run applications, i.e., a layout corresponds to a formation of icons disposed within the integrated icon 930. For instance, as the icon corresponding to the messenger application and the icon corresponding to the web browser application are disposed on the left half and the right half of the integrated icon, respectively, if the applications are simultaneously run, a running screen 1010 of the messenger application and a running screen 1020 of the web browser application are displayed on a region corresponding to the left half of the touchscreen 151 and a region corresponding to the right half of the touchscreen 151, respectively as shown in FIG. 10(a).

For instance, as shown in FIG. 10(b), an icon 1031 corresponding to a messenger application is disposed on a left top end within the integrated icon, an icon 1032 corresponding to a web browser application is displayed on a right top end within the integrated icon, and an icon 1033 corresponding to a gallery application is displayed on a bottom end within the integrated icon. In doing so, as the integrated icon is selected, if the three applications are simultaneously run, referring to FIG. 10(c), a running screen 1031' of the messenger application, a running screen 1032' of the web browser application and a running screen 1033' of the gallery application are disposed on a left top end, a right top end and a bottom end of the touchscreen, respectively.

Figure 11:
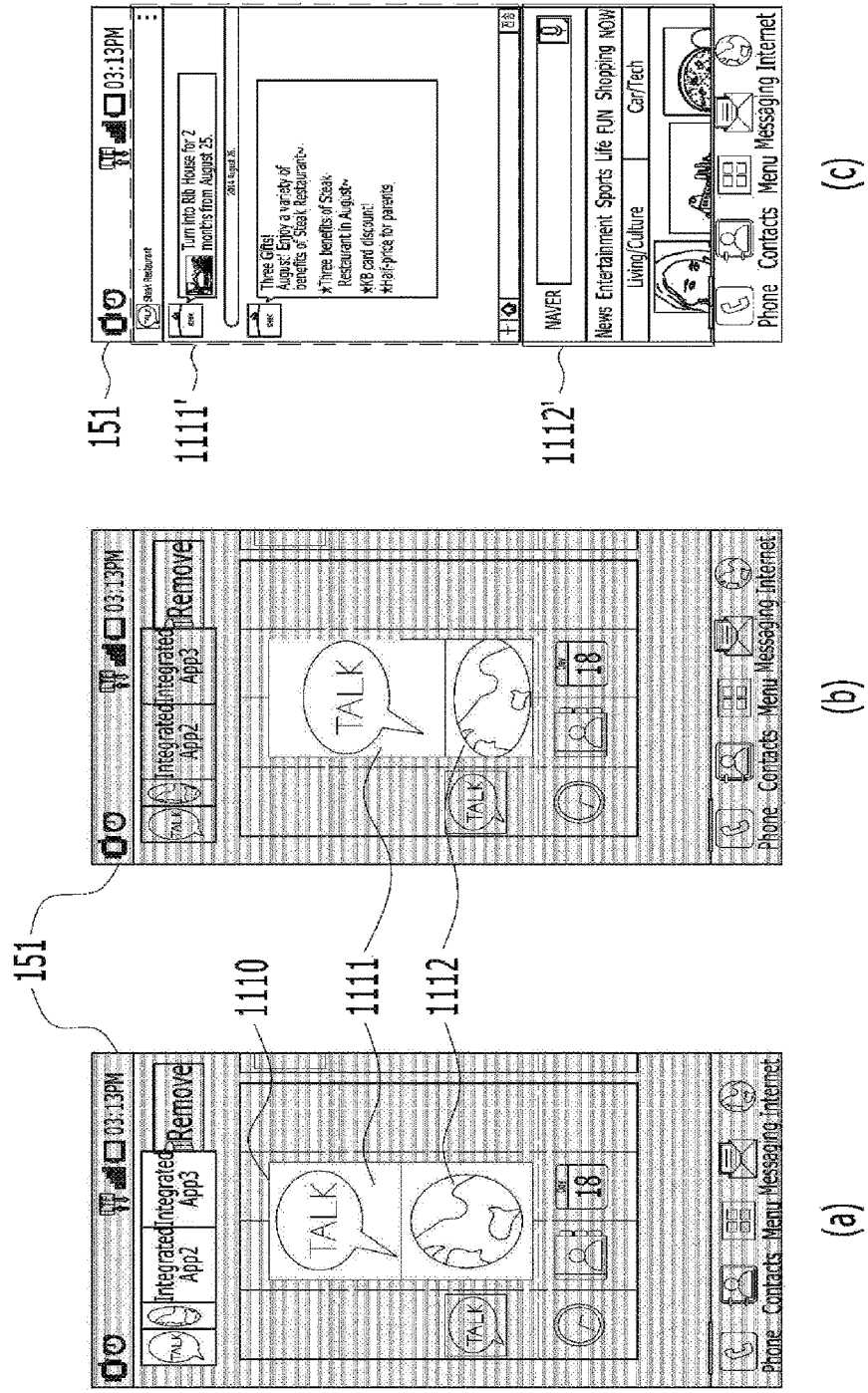
FIG. 11 is a diagram illustrating another example of determining a layout of applications in accordance with an icon disposition within an integrated icon in a mobile terminal according to one embodiment of the present invention.

FIG. 11 is a diagram illustrating another example of determining a layout of applications in accordance with an icon disposition within an integrated icon in a mobile terminal according to one embodiment of the present invention. Referring to FIG. 11(a), as the layout adjust menu 921 shown in FIG. 9(b) is selected, an enlarged integrated icon 1110 can be displayed on the touchscreen 151. In doing so, a dimming effect may be given to the region other than the enlarged integrated icon. If a user touches a boundary line between a messenger icon 1111 and a web browser icon 1112 and then applies a drag in a bottom direction, referring to FIG. 11(b), a region occupied by the messenger icon 1111 can be extended. Thereafter, if the region on which the integrated icon 1110 is not displayed on the touchscreen 151 is touched or a cancel key button is manipulated, the layout adjustment can be completed. If the layout-adjusted integrated icon is selected, referring to FIG. 11(c), when the two applications are simultaneously run, a region occupied by a running screen 1111' of the messenger application is extended like the adjustment performed on the integrated icon, while a region occupied by a running screen 1112' of the web browser application is relatively reduced.

Figure 12:
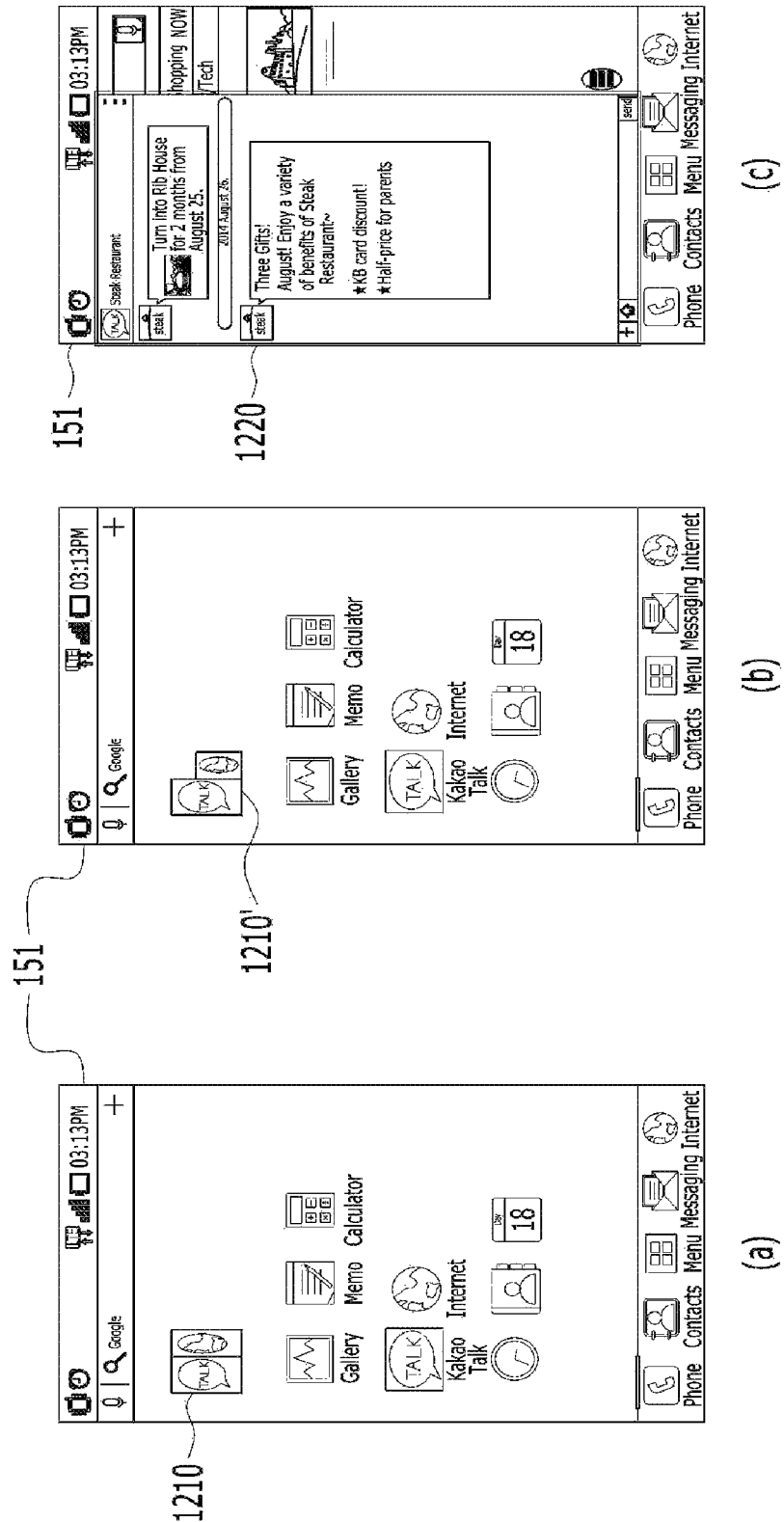
FIG. 12 is a diagram illustrating one example of modifying an integrated icon due to an event occurrence in a mobile terminal according to one embodiment of the present invention.

FIG. 12 is a diagram illustrating one example of modifying an integrated icon due to an event occurrence in a mobile terminal according to one embodiment of the present invention. Referring to FIG. 12(a), an integrated icon 1210 in which icons of a messenger application and a web browser application are included is displayed on a home screen. In this instance, the icons of the applications are disposed in similar sizes within the integrated icon 1210.

In doing so, if a message arrives at the messenger application, referring to FIG. 12(b), the integrated icon 1210' may be modified in a manner that a rate of a region occupied by the icon of the messenger application within the integrated icon is increased. Subsequently, if the modified integrated icon 1210' is selected, referring to FIG. 12(c), when the two applications are simultaneously run, a displayed size of a running screen 1220 of the messenger application may be increased. After the new message has been checked, the rate of the region occupied the running screen of the messenger application and the rate of the region occupied by the messenger application within the integrated icon can return to the previous rated, respectively.

Figure 13:
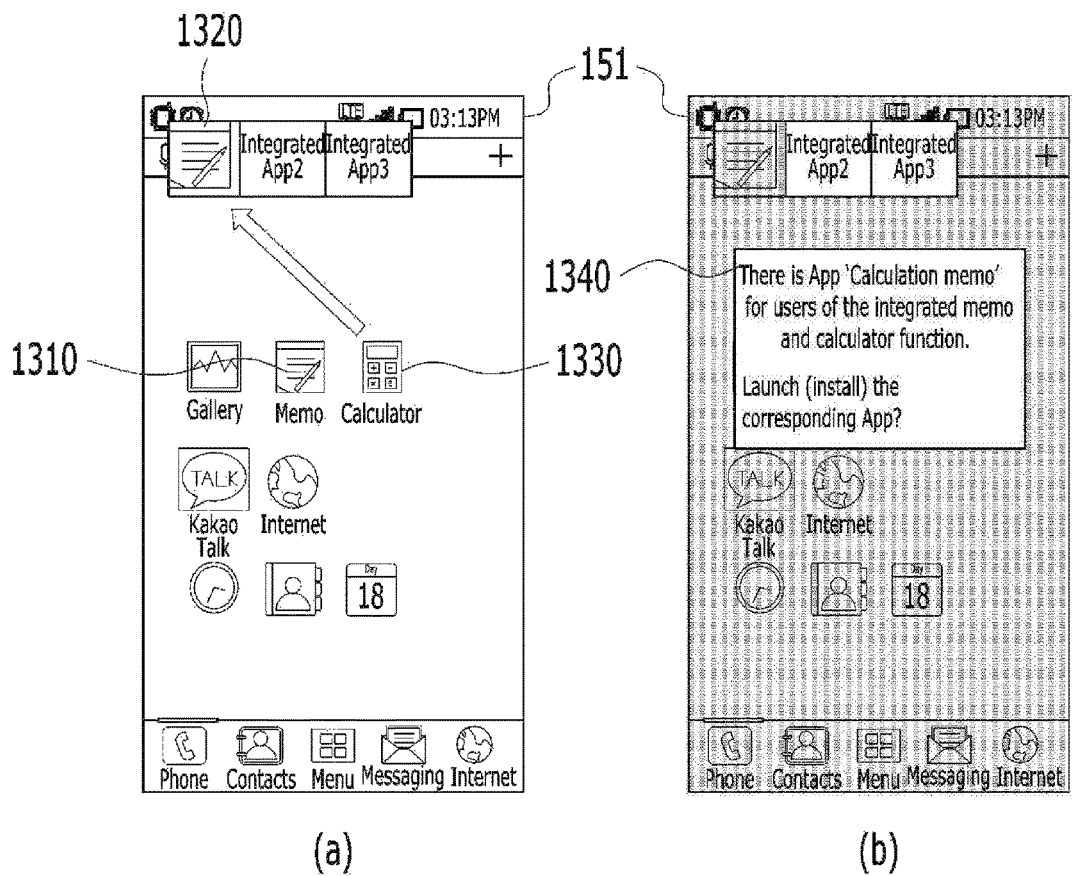
FIG. 13 is a diagram illustrating one example of providing an application recommendation function in an integrated icon creating process in a mobile terminal according to one embodiment of the present invention.

FIG. 13 is a diagram illustrating one example of providing an application recommendation function in an integrated icon creating process in a mobile terminal according to one embodiment of the present invention. Referring to FIG. 13(a), while slots are paged, an icon 1310 corresponding to a memo application has been already moved to a prescribed slot 1320. In doing so, a user can move an icon 1330 of a calculator application to the slot 1320 in order to run the calculator application together with the memo application. In doing so, the controller 180 determines function provided by applications moved to the slot before creating an integrated icon. If there is a specific application capable of providing the combined functions collectively, referring to FIG. 13(b), the controller 180 can inform a user of the existence of the specific application through a popup message 1340. When the user selects the popup message 1340, if the application capable of providing the combined functions together is installed, the corresponding application can be run. Otherwise, a connection to an installable page or the like can be attempted.

Figure 14:
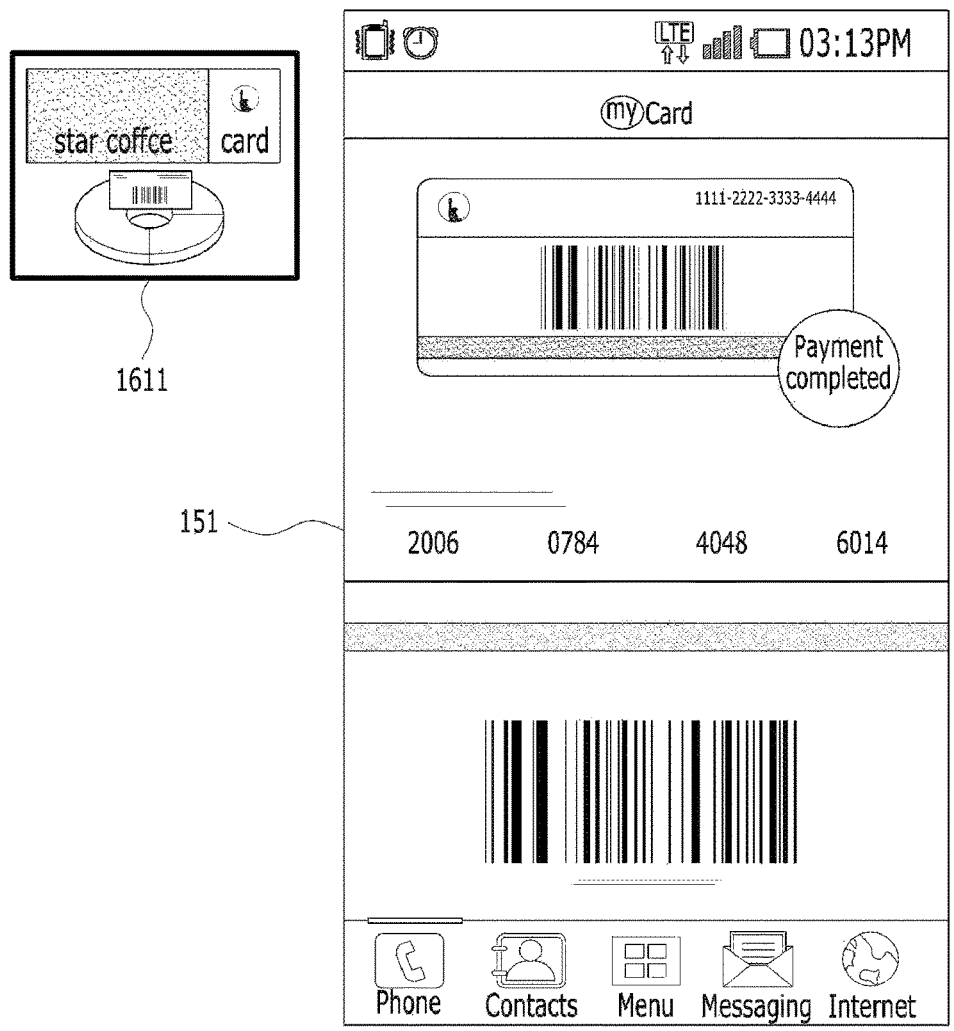
FIG. 14 is a diagram illustrating one example of a launching process depending on a presence or non-presence of an integrated icon for a random application in a mobile terminal according to one embodiment of the present invention.

FIG. 14 is a diagram illustrating one example of a launching process depending on a presence or non-presence of an integrated icon for a random application in a mobile terminal according to one embodiment of the present invention. In FIG. 14, assume a stat that two integrated icons (i.e., one integrated icon including a messenger application and a gallery application and the other integrated icon including the messenger application and a web browser application), each of which includes the messenger application, have been already created in the aforementioned slots, the aforementioned notification panel, or the like.

Referring to FIG. 14(a), a user touches an icon 1410 of the messenger application displayed on a home screen. If an integrated icon including the messenger application does not exist, the messenger application can be run in direct. Yet, if the previously created integrated icons exist like the assumption, referring to FIG. 14(b), a popup window 1420, which is provided to indicate a presence or non-presence of the existence of the integrated icon(s) and to receive a selection for whether to simultaneously run the applications included in the corresponding integrated icon from the user, can be displayed. On the other hand, referring to FIG. 14(c), if the icon 1410 is selected, the integrated icons 1431 and 1432, each of which includes the selected icon 410, may be displayed around the selected icon 1410.

According to one embodiment of the present invention, if a single integrated icon is configured with a plurality of applications respectively providing widgets, the widgets of the corresponding applications can be provided by being integrated. This is described in detail with reference to FIG. 15 as follows.

Figure 15:
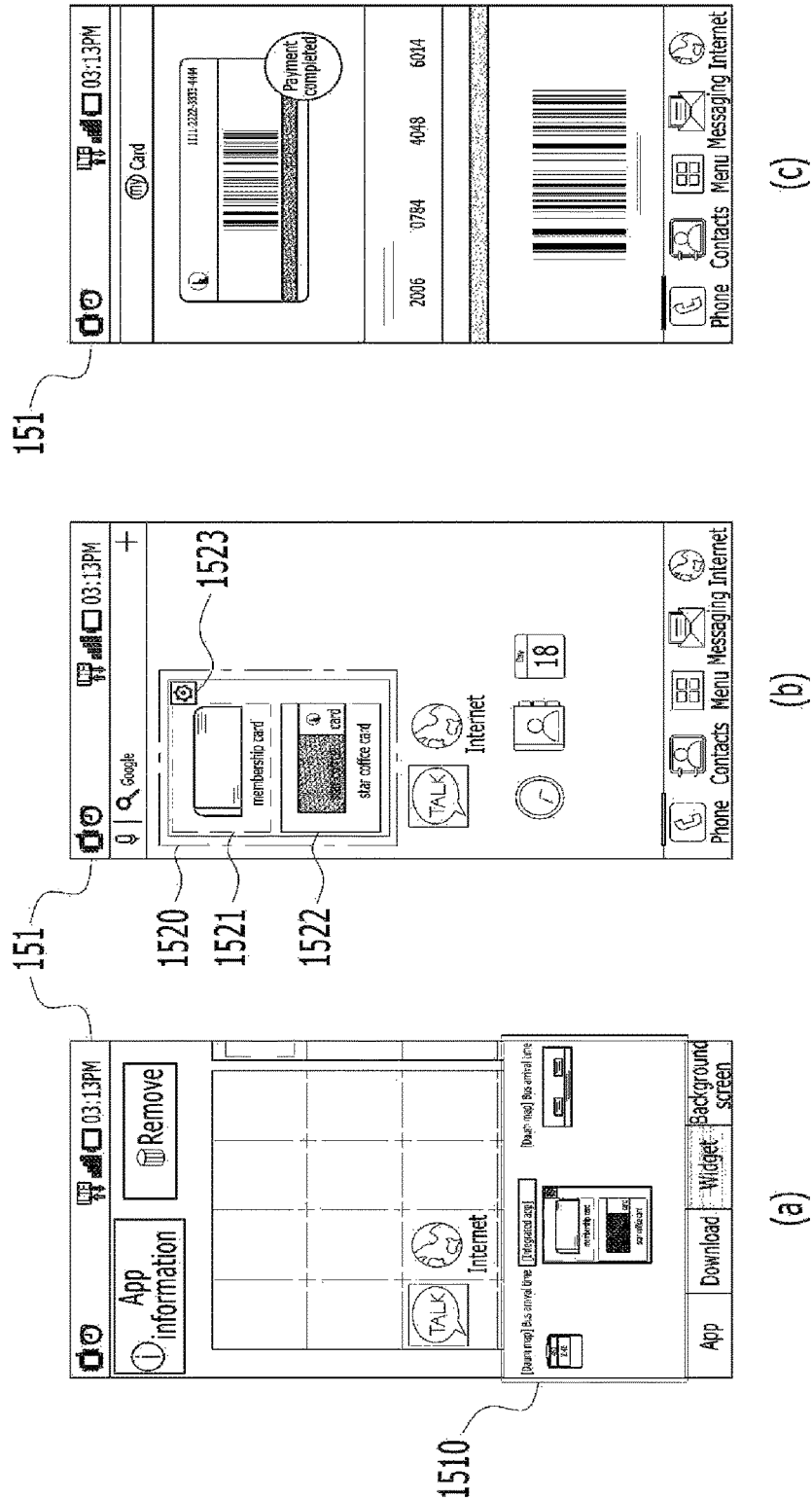
FIG. 15 is a diagram illustrating one example of providing an integrated widget in accordance with an integrate icon creation in a mobile terminal according to one embodiment of the present invention.

FIG. 15 is a diagram illustrating one example of providing an integrated widget in accordance with an integrate icon creation in a mobile terminal according to one embodiment of the present invention. In FIG. 15, assume a state that an integrated icon has been already created to simultaneously run a discount card application and a mileage card application. Assume that each of the two applications provides a widget of its own. And, assume that an integrated widget of the two widgets has been already created.

Referring to FIG. 15(a), a widget list 1510 can be paged on the touchscreen 151 through a prescribed command input. In doing so, if a user long touches an integrated widget item 1511 and then applies a drag to a vacant region of a home screen, referring to FIG. 15(b), an integrated widget 1520 can be displayed. As an integrated icon is partitioned into a top end and a bottom end, if an icon corresponding to the discount card application and an icon corresponding to the mileage card application are disposed on the top end and the bottom end, respectively, a layout of widgets can match that of the icons. In particular, like the example shown in FIG. 15(b), a discount card widget is displayed on a top end region 1521 of the integrated widget 1520, while a mileage card widget is displayed on a bottom end region 1522 of the integrated widget 1520. Moreover, a setting menu 1523 may be displayed on a prescribed region of the integrated widget 1520. Through the setting menu, the integrated widget can be separated into independent widgets.

If the widget corresponding to one of the applications is selected from the integrated widget, only the application corresponding to the selected widget can be run. If a boundary line part between the two regions is selected, referring to FIG. 15(c), the two applications may be simultaneously run in a manner similar to that of the case of selecting the integrated icon.

Combination of applications, which are useful in case of being run together by the aforementioned embodiments, are described in detail with reference to FIGS. 16a to 16e as follows. FIGS. 16a to 16e are diagrams illustrating examples of usefully combinable applications and integrated icon types corresponding to the applications in a mobile terminal according to one embodiment of the present invention, respectively.

Figure 16A:
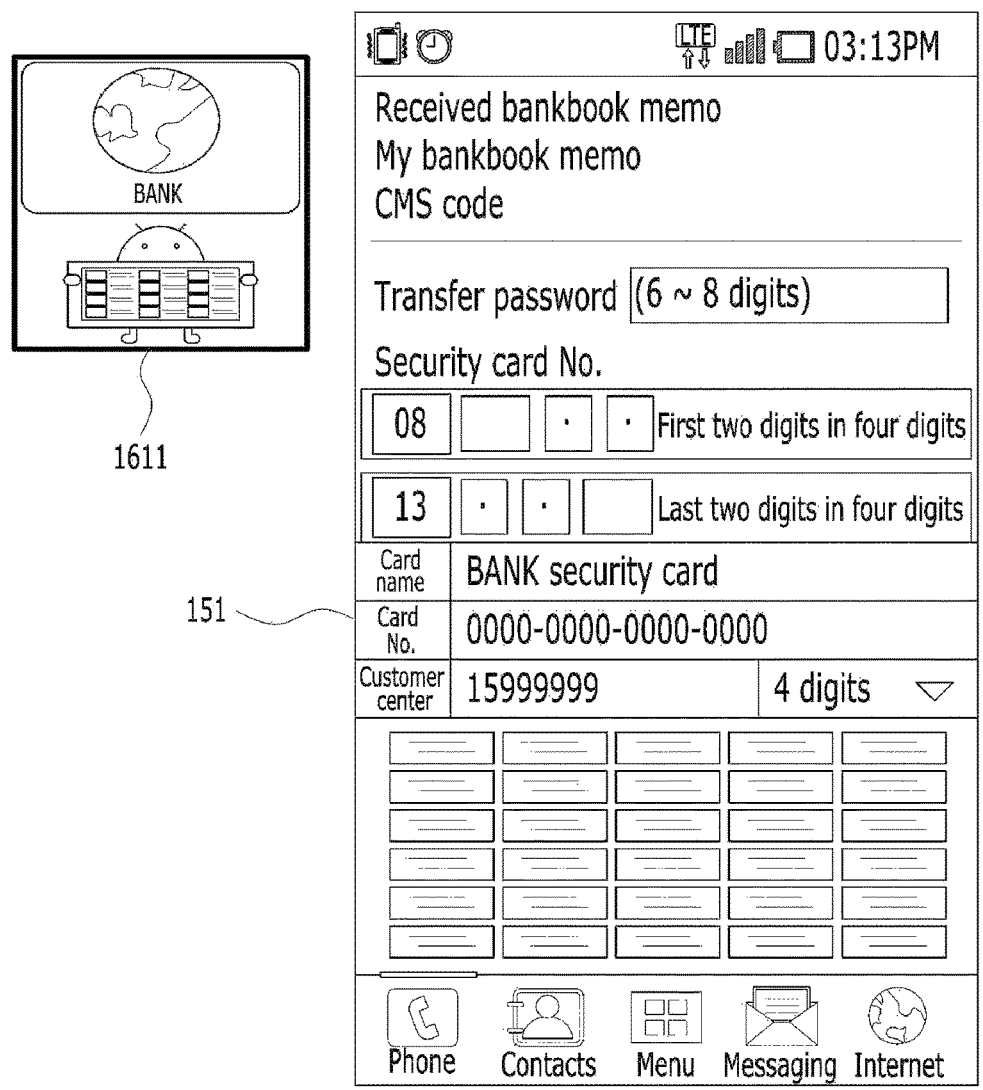
FIGS. 16a to 16e are diagrams illustrating examples of usefully combinable applications and integrated icon types corresponding to the applications in a mobile terminal according to one embodiment of the present invention, respectively.

Referring to FIG. 16a, an icon of a bank application and an icon of a security card application are included in an integrated icon 1611. If the two applications are run together, as shown in the right part of the drawing, when the bank application is used for money transfer and the like, a security card can be referred to without switching to a separate application.

Figure 16B:
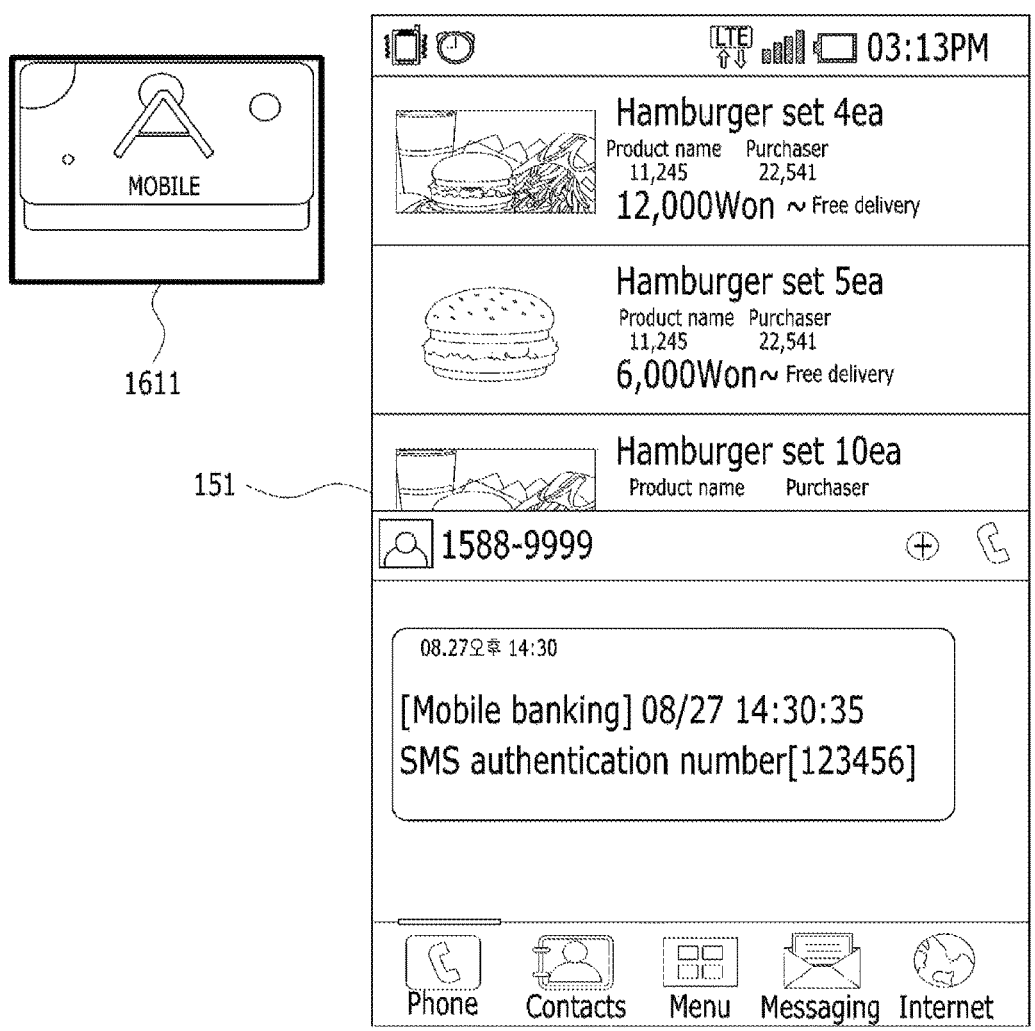

Referring to FIG. 16b, an icon of an online shop application and an icon of an SMS application are included in an integrated icon 1612. If the two applications are run together, as shown in the right part of the drawing, when an online shop payment is made, an SMS authentication text can be checked without switching to a separate application.

Figure 16C:
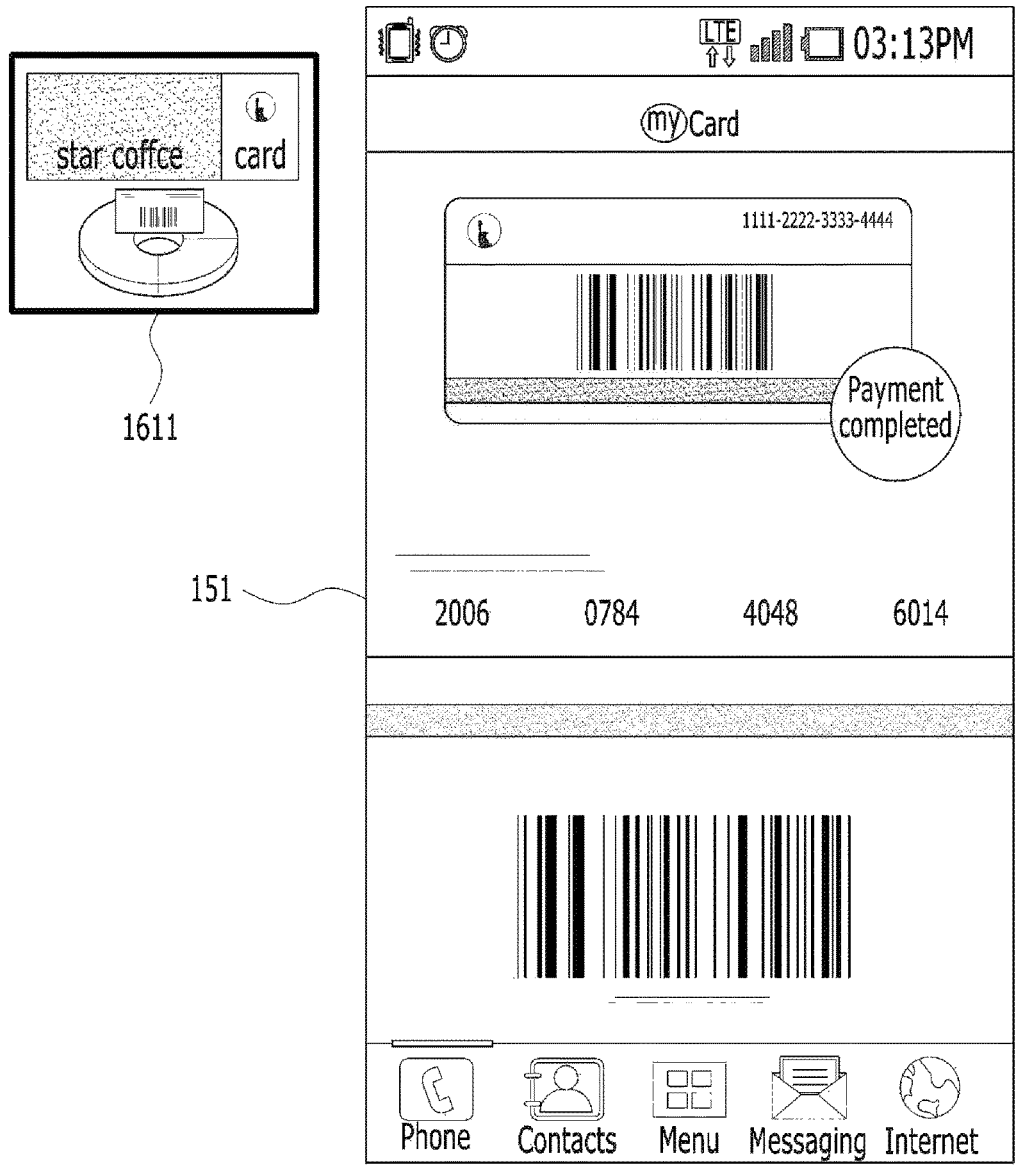

Referring to FIG. 16c, an icon of a mileage application and an icon of a discount card application are included in an integrated icon 1613. If the two applications are run together, as shown in the right part of the drawing, since barcodes of the two cards are simultaneously displayed to facilitate the corresponding payments.

Figure 16D:
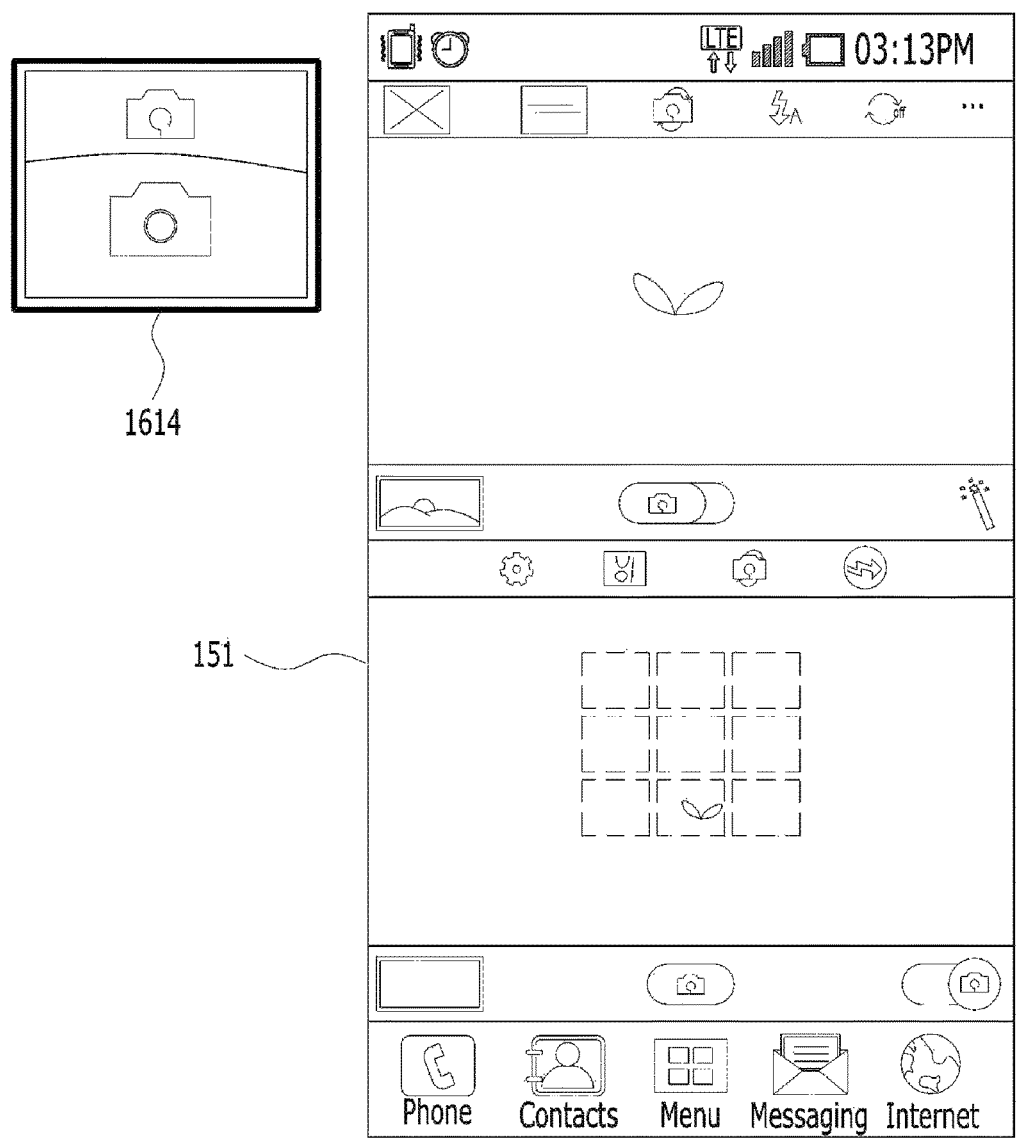

Meanwhile, referring to FIG. 16d, icons of applications (e.g., different camera applications) for the similar purposes may be included in an integrated icon 1614. In this case, if the two applications are run together, as shown in the right part of the drawing, it can simultaneously obtain a plurality of photos resulting from applying different photography settings to the same subject. Of course, if the controller 180 determines that the simultaneously run applications have the same purpose depending on the settings, a command input to one application enables the other to perform an operation in response to the same command input. For instance, if a shutter button for one camera application is touched in the situation shown in FIG. 16D, a photographing can be performed through the other camera application.

Figure 16E:
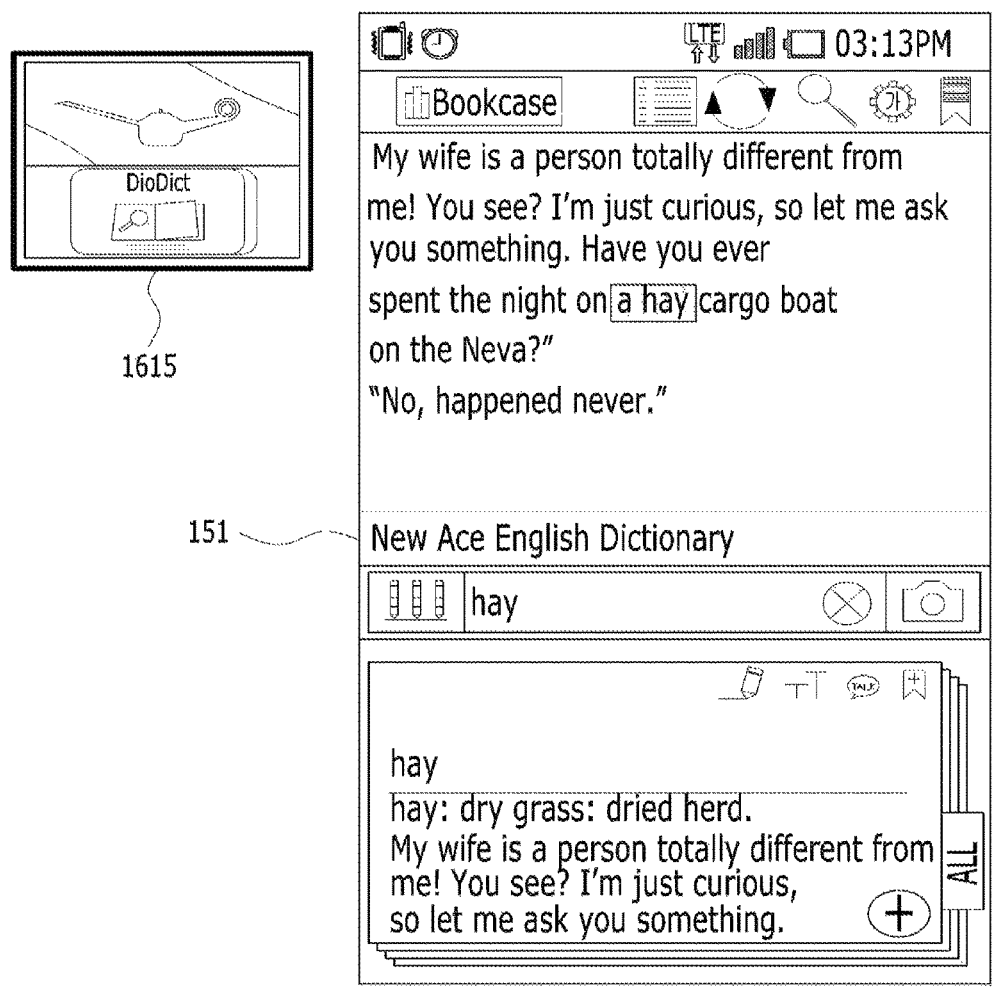

Referring to FIG. 16e, an icon of an e-book application and an icon of an e-dictionary application are included in an integrated icon 1615. If the two applications are run together, as shown in the right part of the drawing, when a dictionary search required word exists in an e-book, it is convenient for the e-dictionary to be directly available.

The above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the mobile terminal. It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of controlling a mobile terminal, the method comprising:

selecting at least first and second applications to be simultaneously executed together;

displaying, via a touchscreen of the mobile terminal, an integrated icon corresponding to the selected first and second applications, wherein a first icon corresponding to the first application and a second icon corresponding to the second application are arranged within the integrated icon; and simultaneously executing, via a controller of the mobile terminal, the first and second applications and displaying execution screens of the first and second applications in a formation corresponding to a layout of the created integrated icon, in response to a selection of the integrated icon, such that the execution screen of the first application and the execution screen of the second application are displayed in accordance with an arrangement of the first icon and the second icon within the integrated icon, and such that a size ratio between the execution screen of the first application and the execution screen of the second application is determined based on a size ratio between the first icon and the second icon within the integrated icon, wherein the method further comprises:

changing the size ratio between the first icon and the second icon within the integrated icon based on an event occurrence related with the first application.

2. The method of claim 1, wherein the selecting the first and second applications comprises:
displaying a page including slots on the touchscreen;
moving the first icon corresponding to the first application to a first slot that is vacant among the slots; and
moving the second icon corresponding to the second application to the first slot.

3. The method of claim 2, wherein the first icon and the second icon are arranged in the integrated icon in accordance with a direction in which the second icon approached the first slot.

4. The method of claim 2, further comprising:
changing the arrangement of the first icon and then the second icon in the integrated icon,
wherein the simultaneously executing the first and second applications comprises displaying the execution screen of the first application and the execution screen of the second application in accordance with the changed arrangement of the first icon and the second icon within the integrated icon.

5. The method of claim 2, wherein the slots are displayed when the first icon is long touched on a home screen of the touchscreen.

6. The method of claim 1, wherein the selecting the first and second applications comprises:
executing the first application;
displaying a multitasking list on the touchscreen; and
selecting the second application from the multitasking list.

7. The method of claim 1, wherein the selecting the first and second applications comprises:
displaying a multitasking list on the touchscreen; and
selecting selectable items corresponding to the first and second applications from the multitasking list.

8. A mobile terminal comprising:
a touchscreen; and
a controller configured to:
receive a selection signal of at least first and second applications to be simultaneously executed together;
display, via the touchscreen, an integrated icon corresponding to the selected first and second applications, wherein a first icon corresponding to the first application and a second icon corresponding to the second application are arranged within the integrated icon; and
simultaneously execute the first and second applications and display execution screens of the first and second applications on the touchscreen in a formation corresponding to a layout of the created integrated icon, in response to a selection of the integrated icon, such that the execution screen of the first application and the execution screen of the second application are displayed in accordance with an arrangement of the first icon and the second icon within the integrated icon, and such that a size ratio between the execution screen of the first application and the execution screen of the second application is determined based on a size ratio between the first icon and the second icon within the integrated icon,
wherein the controller is further configured to:
change the size ratio between the first icon and the second icon within the integrated icon based on an event occurrence related with the first application.

9. The mobile terminal of claim 8, wherein the controller is further configured to:
display a page including slots on the touchscreen;
move the first icon corresponding to the first application to a first slot that is vacant among the slots; and
move the second icon corresponding to the second application to the first slot.

10. The mobile terminal of claim 9, wherein the first icon and the second icon are arranged in the created integrated icon in accordance with a direction in which the second icon approached the first slot.

11. The mobile terminal of claim 9, wherein the controller is further configured to:
change the arrangement of the first icon and then the second icon in the integrated icon, and
simultaneously execute the first and second applications and display the execution screen of the first application and the execution screen of the second application in accordance with the changed arrangement of the first icon and the second icon within the integrated icon.

12. The mobile terminal of claim 9, wherein the slots are displayed when the first icon is long touched on a home screen of the touchscreen.

13. The mobile terminal of claim 8, wherein the controller is further configured to:
execute the first application,
display a multitasking list on the touchscreen,
receive a selection of the second application from the multitasking list, and
select the first application and the second application to be simultaneously executed together via the integrated icon.

14. The mobile terminal of claim 8, wherein the controller is further configured to:
display a multitasking list on the touchscreen,
receive a selection of selectable items corresponding to the first and second applications from the multitasking list, and
select the first application and the second application to be simultaneously run together via the integrated icon, via the selection of the selectable items.

15. The mobile terminal of claim 8, wherein the controller is further configured to:
change the size ratio between the first icon and the second icon within the integrated icon based on a touch drag applied to a boundary between the first icon and the second icon within the integrated icon.

16. The mobile terminal of claim 15, wherein the controller is further configured to:
display an enlarged version of the integrated icon,
wherein the touch drag is applied to the boundary between the first icon and the second icon within the enlarged version of the integrated icon.

17. The mobile terminal of claim 8, wherein the first icon corresponding to the first application is increased and the second corresponding to the second application is decreased within the integrated icon in response to the event occurrence related with the first application.

18. The mobile terminal of claim 17, wherein the first application is related to a message application, and the event occurrence is related to reception of a message via the message application.

19. The mobile terminal of claim 18, wherein the controller is further configured to:
restore the changed size ratio between the first icon and the second icon within the integrated icon after the received message is checked.

* * * * *